July 9, 1957

C. P. KIPP 2,798,935

CONTACT FEED MECHANISM

Filed July 17, 1952

INVENTOR.
Calvin P. Kipp
BY *Edwin Leverault +*
*Harry Cole*

ATTORNEY

July 9, 1957

C. P. KIPP 2,798,935

CONTACT FEED MECHANISM

Filed July 17, 1952

INVENTOR.
Calvin P. Kipp
BY
ATTORNEY

July 9, 1957 C. P. KIPP 2,798,935
CONTACT FEED MECHANISM
Filed July 17, 1952 3 Sheets-Sheet 3
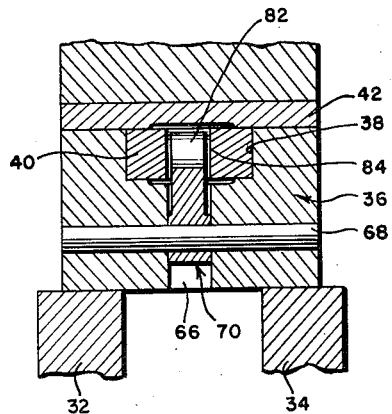
FIG. 6
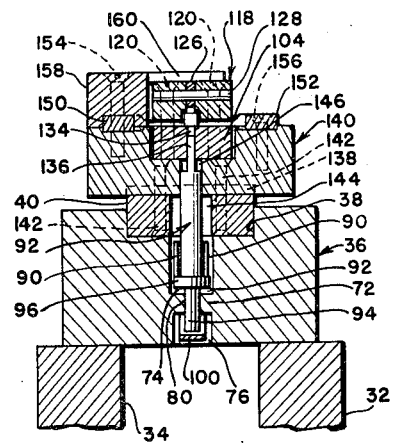
FIG. 7
FIG. 5
INVENTOR.
Calvin P. Kipp
BY
ATTORNEY

United States Patent Office 2,798,935
Patented July 9, 1957

2,798,935

CONTACT FEED MECHANISM

Calvin P. Kipp, Summit, N. J., assignor to Federal Electric Products Company, Newark, N. J., a corporation of Delaware Application July 17, 1952, Serial No. 299,373

13 Claims. (Cl. 219—79)

The present invention relates, in general, to a novel apparatus for individually transferring or feeding articles from a delivery point thereof to a machine in which the articles are to be further processed, and, in particular, to mechanism provided in a circuit breaker assembly machine for automatically supplying to said machine the electric contacts for the circuit breakers.

The primary object of the present invention is to provide a generally improved and simplified feed mechanism for individually supplying articles to a machine in timed relation with the operation thereof.

Another object is the provision in such mechanism of means for picking the foremost article from a row or column thereof and transferring said article to a machine while retaining the remaining articles in position in said row or column.

A further object is the provision of means for assembling an electric contact and a switch arm at the station, in a machine for manufacturing circuit breaker sub-assemblies, at which the electric contacts are fed to the machine, and in the further provision of means at said station for welding the contact to the switch arm.

The above and other objects, the features and advantages of the present invention will be more fully understood from the following description considered in connection with the accompanying illustrative drawings.

In the drawings:

Fig. 5 is a view similar to Fig. 3 with the parts thereof being shown in another operative disposition thereof;

Fig. 6 is a sectional view taken on the line 6—6 of Fig. 3; and

Fig. 7 is a sectional view taken on the line 7—7 of Fig. 3.

The feed mechanism of the present invention is illustrated and described herein in connection with a machine for manufacturing sub-assemblies for automatic circuit breakers, with which machine it is being presently used. However, it will be understood that its use is not limited thereto, and that the mechanism of the present invention may be used in connection with other types of machines and with articles other than electric contacts.

In a known machine for making sub-assemblies of operating mechanisms for automatic circuit breakers, the work is carried to and from the various stations by work holders provided on a pair of turrets, or rotary conveyors, which are intermittently rotated, in timed relation to each other, to position said work holders in succession at the various stations associated with each turret, while the particular operation thereof is being performed. During the course of the operation of the machine, a portion of the sub-assembly, which has been assembled on one of the turrets, is transferred to the other turret and consolidated with a sub-assembly portion already assembled on the latter, to provide the completed sub-assembly of the operating mechanism for the circuit breaker.

Figure 1:
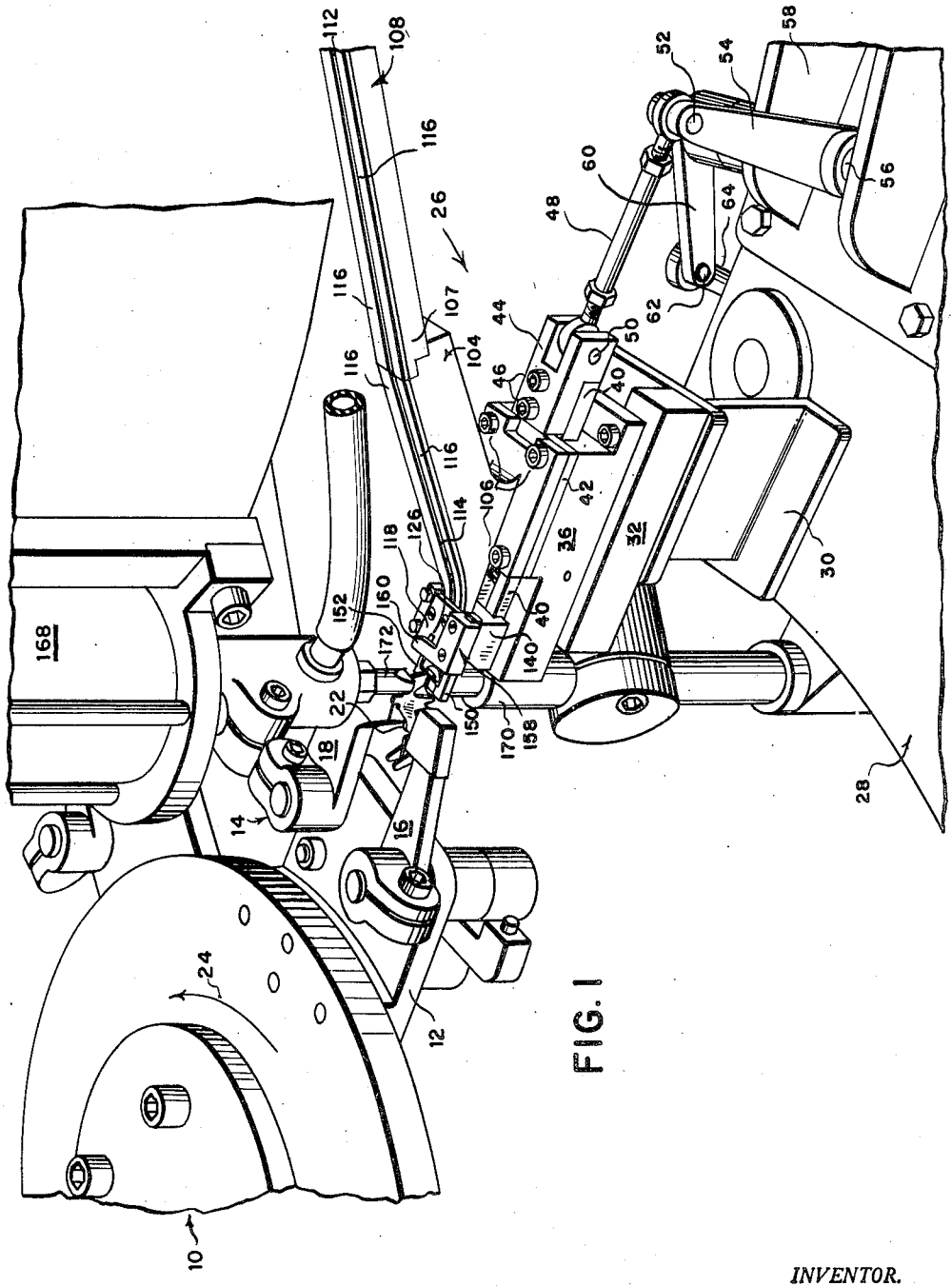
Fig. 1 is a perspective view of a portion of a machine for manufacturing sub-assemblies of operating mechanisms for automatic circuit breakers provided with a contact feed mechanism pursuant to the present invention.
Figure 4:
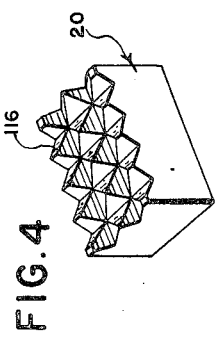
Fig. 4 is an enlarged view of an electric contact utilized with the feed mechanism.

The present invention, in the present use thereof, is concerned with apparaus at one of the stations associated with the turret from which the first mentioned portion of the sub-assembly is transferred to the other turret for consolidation with the sub-assembly portion already assembled on the latter. A portion of said first mentioned turret or conveyor is indicated by the reference numeral 10 in Fig. 1. Said turret is provided with a plurality of equally spaced brackets 12, each of which mounts a work holder 14 constituted by the companion jaw members 16 and 18. It will be understood that suitable provision is made for intermittently rotating the turret 10, as illustrated and described in said copending applications, to carry the work holders 14 to the various stations at which the various operations, respectively, are to be performed. As illustrated in Fig. 1, a work holder 14 is in position at a station to receive an electric contact 20, of the type illustrated in Fig. 4, for assembly with a movable switch arm 22 for a circuit breaker mechanism, which switch arm is retained between the companion jaw members of said work holder. Suitable mechanism may be provided for supplying the switch arms 22 to the work holders. It will be understood that the turret 10 rotates in the direction of the arrow 24 and that the mechanism for supplying the switch arms 22 thereto is positioned at a station of the assembly machine which is prior, in the direction of rotation of said turret, to the station at which the contact feed mechanism is positioned.

The feed mechanism for the electric contacts 20, pursuant to the present invention, is generally indicated by the reference numeral 26 in Fig. 1. Said feed mechanism is mounted on a convenient portion 28 of the framework of the circuit breaker assembly machine, which framework portion is provided with a support 30 which mounts the mechanism 26. Said support is provided with the spaced blocks 32 and 34 which mount the base 36 of the feed mechanism. The base 36 is provided with a slideway 38 in which there is slidably mounted, for horizontal reciprocation, viewing Fig. 3, actuating means constituted by the slide member 40. A plate 42 which is secured to the base 36 overlies part of the slideway.

Figure 2:
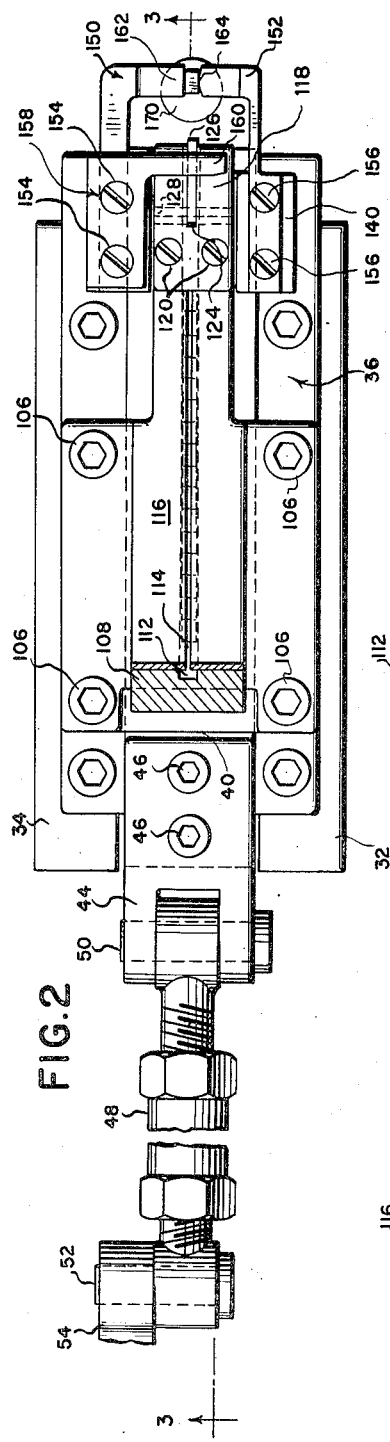
Fig. 2 is a plan view of the feed mechanism pursuant to the present invention, with parts broken away for purposes of illustration, an electric contact being shown in position as delivered from said mechanism to the circuit breaker assembly machine.
Figure 3:
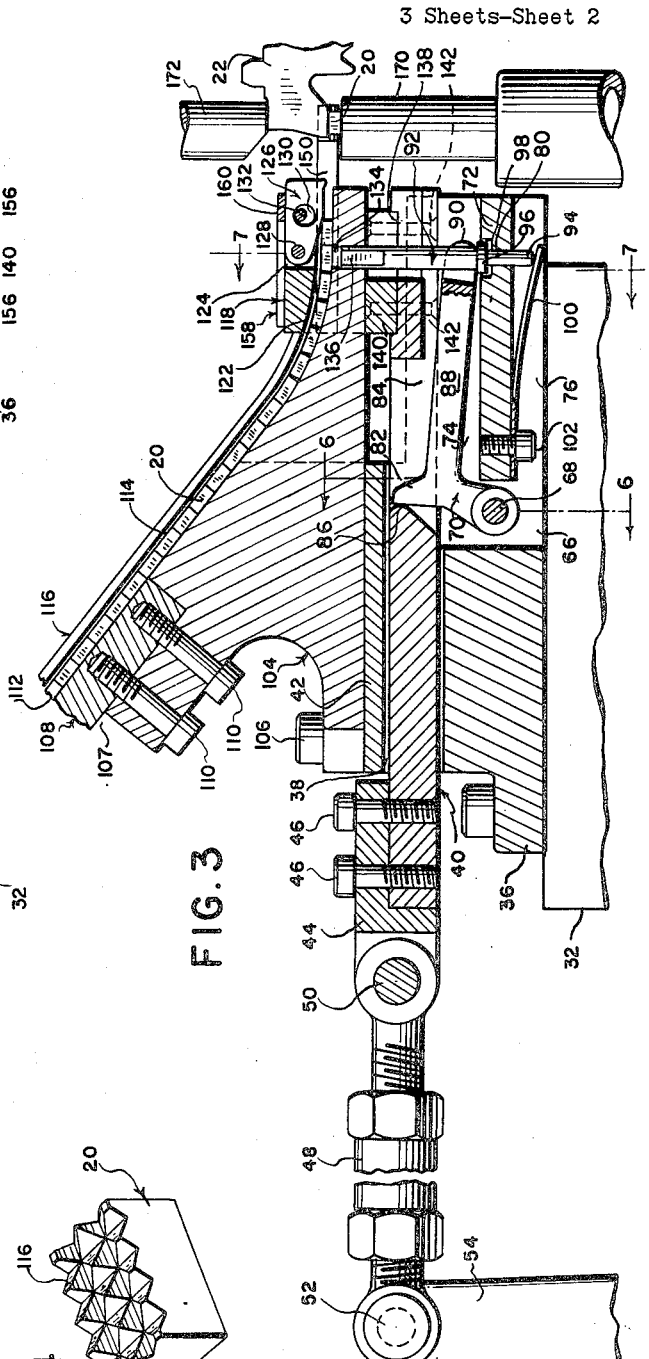
Fig. 3 is a sectional view taken on the line 3—3 of Fig. 2.

In order to effect said horizontal reciprocation of the slide 40, the latter is provided with a knuckle block 44 secured thereto, as by the bolts 46. A rod 48 has one end thereof pivotally engaged in the block 44, as at 50, the other end of which is pivotally connected, as at 52, to one end of a link 54, the other end of which is keyed to a shaft 56 which is suitably mounted for rotation in the framework portion 58 by a link 60. Said link 60 is pivotally connected, as at 62, to one end of a link member 64 which is suitably mounted for vertical reciprocation by suitable mechanism in timed relation with the rotation of the turret 10. Therefore, it will be readily understood that when the link 64 is moved upwardly the rod 48 will be moved in a direction away from the turret 10 for carrying the slide 40 to the retracted position thereof illustrated in Fig. 5, and upon downward movement of the link 64, the slide 40 will be moved to the projected position thereof, as illustrated in Figs. 1, 2 and 3.

In addition to the horizontally disposed slideway 38, the base 36 is also provided with a vertically extending opening 66 across which there extends the transversely disposed pivot member 68 which pivotally mounts the lever 70. It will be noted that the base 36 is also provided, forwardly of the vertically extending opening 66, with an integral portion 72 which separates the vertically spaced chambers 74 and 76, respectively, defined therein, said portion 72 being apertured, as at 80, for a purpose hereinafter described. The lever 70 is provided with an upwardly extending ear 82 which extends into an enclosed slot 84, provided in the slide 40, for engagement by a portion 86 of the slide 40, at one end of said slot, in the projected position of the slide, as illustrated in Fig. 3. The lever 70 is also provided with an axially extending portion 88 which extends into the chamber 74, and which is forked at the free end 90 thereof, as best illustrated in Fig. 3. From the foregoing, it will be understood that when the slide 40 is moved to the projected position thereof, the portion 86 thereof will engage the ear 82 of lever 70 to pivot the latter downwardly, from the position thereof illustrated in Fig. 5, to the position thereof illustrated in Fig. 3.

The aforesaid pivotal movement of the lever 70 serves to operate a vertically disposed plunger 92. More specifically, it will be noted from Figs. 3, 5 and 7, that said plunger is provided with a lower end portion 94, of reduced diameter, which extends through the aforementioned aperture 80 in the portion 72 of the base 36. The plunger 92 is also provided with a collar 96 which is adapted to seat within a recess 98 provided in the base portion 72 to guide the downward movement of the plunger 92. It will be noted that the forked ends 90 of the lever 70 are disposed upon the collar 96 of the plunger 92, as best illustrated in Figs. 3 and 7. A leaf spring 100, disposed within the aforementioned chamber 76 in the base 36, has one end thereof secured to the integral portion 72 of the base, as by the bolt 102, and the free end thereof abuts the lower end 94 of the plunger 92 for biasing the latter to the projected position thereof illustrated in Fig. 5. From the foregoing, it will be understood that the movement of the slide 40 to the projected position thereof illustrated in Fig. 3, pivots the lever 70 downwardly for carrying the plunger 92 downwardly to the retracted position thereof, against the bias of the spring 100, and upon movement of the slide in the opposite direction, the plunger is raised to the projected position thereof by the spring 100.

Overlying the slideway 38 therein, the base 36 is provided with a fixture or member 104 which is secured thereto, as by the bolts 106, which also serve to secure the aforementioned plate 42 in position on the base 36. The lower end 107 of an inclined chute or slide 108 for the contacts 20 is secured to the member 104, as by the bolts 110, so that the contact slideway 112 provided in the chute 108 is in registry with a contact slideway 114 provided in the member 104. It will be understood that suitable apparatus (not illustrated) is provided for feeding the contacts 20 into the slideway 112 of the chute 108 so that said contacts are positioned in a row therein with the rough welding surface 116 (Fig. 4) thereof uppermost. Suitable mechanism may be provided for feeding contacts 20 from a supply hopper and for sending said contacts down the chute 108 with the surfaces 116 thereof uppermost. Cover plates 116—116 are provided for the chute 108 and for the member 104 for retaining the contacts 20 in the slideways. At the delivery outlet of the slideway 114, the fixture 104 is provided with a member 118 which overlies said slideway 114. Said member 118 is suitably secured to the fixture 104, as by the screws 120. Said member 118 is provided with a curved portion 122, as best illustrated in Figs. 3 and 5, to permit the passage of the contacts 20 thereunder. The member 118 is also provided with an open-ended slot 124 in which there is disposed a latch or contact stop 126 which is pivotally mounted on the pivot pin 128 carried by said member 118. The latch is also provided with an opening 130 through which there extends a pin member 132 carried by the member 118, it being noted that the opening 130 is larger than the diameter of pin 132. The fixture 104 is provided with an opening 134, below member 118, which extends therethrough and in which there is disposed the narrowed free end portion 136 of the plunger 92.

At the free end thereof the slide 40 is provided with a recessed portion or seat 138 which extends transversely thereof and in which there is received a holder member 140 which is secured to the slide, as by the screws 142. An open-ended slot 144 is provided at the free end of the slide 40 and an open-ended slot 146, in overlying registry therewith, is provided in the holder 140, it being noted that the plunger 92 extends through the aligned slots 144 and 146 in the projected position of the slide 40, as illustrated in Figs. 3 and 7. It will be noted from Fig. 7 that the holder 140 straddles the forward end 148 of the member 104, at the lower side thereof, and is provided with the cooperating projecting fingers or jaws 150 and 152, which constitute a contact carrier and which are secured thereon, as by the screws 154 and 156, respectively. It will be understood that the finger 150 is substantially rigid and that the finger 152 is formed of suitable spring metal to provide the latter with a desired resiliency for a purpose hereinafter described in detail. Overlying the secured end of the finger 150, the holder 140 is provided with a detent element 158 having a laterally extending finger 160, said detent element being secured to the holder 140 by the aforesaid screws 154.

With contacts 20 supplied to the chute 108, said elements will form a column or row extending from the slideway 112 in said chute downwardly into the slideway 114 of the fixture 104. Assuming now that the various parts are disposed, as illustrated in Fig. 3, so that the slide 40 is in the projected position thereof for retracting the plunger 92 against the bias of the spring 100, it will be noted from Fig. 2 that the finger 160 of the detent element 158 overlies and engages the latch 126 adjacent the forward free end thereof to pivot the latch downwardly and to retain the latter in said position. In said disposition of the parts, the forwardmost or first contact in the column will have passed under the member 118 and be wedged against the latch 126 which extends into the path of movement thereof and is retained in said wedging position thereof by the overlying finger 160 which prevents the upward pivoting of said latch when engaged by the foremost contact. In said position of the parts, it will be noted that the fingers 150 and 152 project beyond the forward end 148 of the fixture 104. Upon return movement of the slide 40 to the retracted position thereof, as illustrated in Fig. 5, the plunger 92 will be projected by the spring 100 to the position thereof illustrated in Fig. 5, wherein the upper free end of the plunger extends into the slideway 114 to engage the contact 20A which is second in the row of contacts, being immediately behind the forwardmost contact 20B. In view of the fact that the detent element 158, as well as the fingers 150 and 152 move as a unit with the plunger 40, it will be noted that the detent finger 160 clears the latch 126 in the retracted position of the slide. During said movement of the slide to its retracted position, the fingers 150 and 152, which are normally separated at their confronting ends 162 and 164, respectively, by a distance which is smaller than the width of a contact, will engage the foremost contact 20B to move the latter against the projecting end portion 136 of the plunger 92, as illustrated in Fig. 5. It will be understood in this connection that the forwardmost contact 20B is free to move toward the plunger 92 since the latch 126 is free to pivot upwardly upon the retraction of said fingers 150 and 152, it being noted that said upward movement of the latch is limited by the pin 132. It will also be noted that since the second contact 20A was disposed to overlie the opening 134, in the fixture 104, when the first contact 20B was wedged in position by the latch 126, as illustrated in Fig. 3, said second contact 20A is engaged by the plunger 92 in the projected position thereof and wedged against the overlying portion of the member 118 to prevent downward movement of the row contacts when the detent finger 160 releases the latch 126. Continued rearward movement of the fingers 150 and 152, after the forwardmost contact 20B abuts the plunger 92, results in the engagement of said contact 20B between the opposing ends 162 and 164 of said fingers, it being noted that the resilient finger 152 will yield sufficiently to provide for said engagement of the contact and will also serve to resiliently retain said contact between the cooperating fingers. Upon the next movement of the slide 40 to the projected position thereof, the foremost contact 20B will be carried outwardly of the forward end of the fixture 104, the plunger simultaneously being carried to its retracted position to release the second contact 20A which now moves with the row of contacts underneath the latch 126 to be wedged between the latch and the fixture 104, in view of the concomitant movement of the detent finger 160 into engagement with the latch to prevent the upward pivoting thereof.

Suitable automatic electric welding mechanism 168 is provided adjacent the feed mechanism 26. More specifically, said welding mechanism is provided with a lower stationary electrode 170 and with a pneumatically operated reciprocating upper electrode 172. It will be noted that the stationary electrode 170 is so disposed, relative to the feed mechanism 26, as to underlie the contact carried between the fingers 150 and 152 in the projected position thereof, as illustrated in Figs. 2 and 3. As previously indicated, the lever 64 operates in timed relation with the intermittent movements of the turret 10. More specifically, the lever 64 moves downwardly during the intermittent movements of the conveyor 10 so that a contact 20 will be positioned at the upper end of the stationary electrode 170 prior to the arrival of a work holder 14 at the welding apparatus 168. Upon the arrival of a work holder at said welding apparatus, the switch member 22 carried thereby is automatically positioned to overlie the contact carried between the fingers 150 and 152, as illustrated in Fig. 3. Thereafter, the upper electrode 172 moves down to engage the switch member and to securely retain the latter in abutment with the contact, the latter abutting the lower electrode 170. The slide 40 now returns to the retracted position thereof so that the fingers disengage the contact which is securely retained on the lower electrode 170 by the pressure of the upper electrode 172 against the switch arm 22. The welding current flow is then automatically initiated to weld the switch member 22 to the contact, it being noted that said switch member abuts the rough surface 116 of the contact to provide for a firm weld therebetween. Upon termination of the welding current, the upper electrode 172 is retracted and the conveyor 10 then moves through the next intermittent stepwise rotation thereof to carry the assembled switch arm and contact away from the welding apparatus for further processing thereof. The slide 40 again moves to the projected position thereof to repeat the described cycle of operation.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. Article feed mechanism comprising means provided with an article slideway in which the articles are aligned in a row, a pivotally mounted latch operable to releasably retain the first article in the row at the outlet of said slideway, a plunger operable to releasably retain the second article in the row upon release of the first article by said latch, a slide member, cooperating fingers carried by said slide member and movable thereby for carrying the first article from said outlet to a position outwardly of said mechanism, detent means carried by said slide for releasably locking said latch in retaining disposition upon said movement of said fingers, and lever means operatively engaged between said slide and said plunger and operable by said slide for moving said plunger to article releasing disposition thereof upon said movement of said fingers.

2. In apparatus of the character described, intermittently operable conveyor means having a station provided with automatic welding mechanism and with article feed mechanism, said welding mechanism having a stationary electrode and a companion reciprocating electrode, said feed mechanism having means for individually positioning a first article between said electrodes in timed relation to said conveyor means, and said conveyor means being provided with work holders for positioning a second article between said electrodes for welding to said first article upon operation of said welding mechanism.

3. In apparatus for assembling sub-assemblies of operating mechanisms for circuit breakers, an intermittently operable conveyor provided with work holders adapted to carry circuit breaker switch members, said apparatus having a station provided with automatic welding mechanism and with an electric contact feed mechanism, said welding mechanism having a stationary electrode and a companion reciprocating electrode, said conveyor being operable to position a switch member between said electrodes between the intermittent movements thereof, and said feed mechanism having a slideway in which the contacts are aligned in a row and being provided with means operable in timed relation to said conveyor for carrying the first contact in the row from the outlet of said slideway to disposition on said stationary electrode prior to the arrival of a switch member at said station for welding to the switch member.

4. In apparatus for assembling sub-assemblies of operating mechanisms for circuit breakers, an intermittently operable conveyor provided with work holders adapted to carry circuit breaker switch members, said apparatus having a station provided with automatic welding mechanism, and with an electric contact feed mechanism, said welding mechanism having a stationary electrode and a companion reciprocating electrode, said conveyor being operable to position a switch member between said electrodes between the intermittent movements thereof, and said feed mechanism having a slideway in which the contacts are aligned in a row and being provided with means operable in timed relation to said conveyor for carrying the first contact in the row from the outlet of said slideway to disposition on said stationary electrode prior to the arrival of a switch member at said station for welding to the switch member, and said feed mechanism having means to releasably retain the second contact in the row at the outlet of said slideway when the first contact is carried to said welding mechanism.

5. In apparatus of the character described, intermittently operable conveyor means having a station provided with automatic welding mechanism and with article feed mechanism, said welding mechanism having companion relatively movable electrodes, said feed mechanism having means for individually positioning a first article between said electrodes in timed relation to said conveyor means, and said conveyor means being provided with work holders for positioning a second article between said electrodes for welding to said first article upon operation of said welding mechanism.

6. In apparatus for assembling sub-assemblies of operating mechanisms for circuit breakers, an intermittently operable conveyor provided with work holders adapted to carry circuit breaker switch members, said apparatus having a station provided with automatic welding mechanism and with an electric contact feed mechanism, said welding mechanism having companion relatively movable electrodes, said conveyor being operable to position a switch member between said electrodes between the intermittent movements thereof, and said feed mechanism having a slideway in which the contacts are aligned in a row and being provided with means operable in timed relation to said conveyor for carrying the first contact in the row from the outlet of said slideway to disposition between said electrodes for welding to a switch member positioned therebetween.

7. Article feed mechanism comprising means provided with an article slideway in which the articles are aligned in a row, a pivotally mounted latch operable to releasably retain the first article in the row at the outlet of said slideway, a plunger operable to releasably retain the second article in the row upon release of the first article by said latch, a slide member, cooperating fingers carried by said slide member and movable thereby for carrying the first article from said outlet to a position outwardly of said mechanism, detent means carried by said slide for releasably locking said latch in retaining disposition upon said movement of said fingers, and means operable in response to said movement of said fingers for moving said plunger to article releasing disposition thereof upon said movement of said fingers.

8. Article feed mechanism comprising means provided with an article slideway in which the articles are aligned in a row, a latch operable at one side of said slideway transversely thereof to releasably retain the first article in the row in position therein, a plunger operable at the other side of said slideway transversely thereof to releasably retain the second article in the row upon release of the first article by said latch, an actuating member, and article grasping means operable by said actuating member in a direction between said latch and plunger and transversely of the direction of operation of said latch and said plunger for releasing the first article from said latch to carry said first article from said slideway.

9. Article feed mechanism comprising means provided with an article slideway in which the articles are aligned in a row, a latch operable at one side of said slideway transversely thereof to releasably retain the first article in the row in position therein, a plunger operable at the other side of said slideway transversely thereof to releasably retain the second article in the row upon release of the first article by said latch, an actuating member, and article grasping means operable by said actuating member in a direction between said latch and plunger and transversely of the direction of operation of said latch and said plunger for releasing the first article from said latch to carry said first article from said slideway, said grasping means comprising spring biased elements operable to straddle the first article in said row, and said plunger constituting an abutment for said first article to facilitate the straddling thereof by said spring biased elements.

10. Article feed mechanism comprising means provided with an article slideway in which the articles are aligned in a row, a latch operable to releasably retain the first article in said row in position on said slideway, a reciprocable member operable to engage the second article in said row in position on said slideway, article grasping means movable between said position of said first article and a position outwardly of said slideway for grasping said first article in said position thereof on said slideway and for carrying the latter outwardly of said slideway, and actuating means for operating said member and said grasping means in timed relation to effect said engagement of the second article concomitantly with said grasping of said first article and the release of said second article upon the carrying of the first article outwardly of the slideway, and detent means for said latch operable by said actuating means in timed relation with the operation of said member and said grasping means for releasing said latch concomitantly with said grasping of the first article and the engagement of said second article.

11. Article feed mechanism comprising means provided with an article slideway in which the articles are aligned in a row, a latch operable to releasably retain the first article in said row in position on said slideway, a reciprocable member operable to engage the second article in said row in position on said slideway, article grasping means movable between said position of said first article and a position outwardly of said slideway for grasping said first article in said position thereof on said slideway and for carrying the latter outwardly of said slideway, and actuating means for operating said member and said grasping means in timed relation to effect said engagement of the second article concomitantly with said grasping of said first article and the release of said second article upon the carrying of the first article outwardly of the slideway, and detent means for said latch operable by said actuating means in timed relation with the operation of said member and said grasping means for releasing said latch concomitantly with said grasping of the first article and the engagement of said second article, said actuating means comprising a slide provided with said detent means and with said grasping means, and means operable by said slide for reciprocating said member.

12. Article feed mechanism comprising means provided with an article slideway in which the articles are aligned in a row, a latch operable to releasably retain the first article in said row in position on said slideway, a reciprocable member operable to engage the second article in said row in position on said slideway, article grasping means movable between said position of said first article and a position outwardly of said slideway for grasping said first article in said position thereof on said slideway and for carrying the latter outwardly of said slideway, and actuating means for operating said member and said grasping means in timed relation to effect said engagement of the second article concomitantly with said grasping of said first article and the release of said second article upon the carrying of the first article outwardly of the slideway, and detent means for said latch operable by said actuating means in timed relation with the operation of said member and said grasping means for releasing said latch concomitantly with said grasping of the first article and the engagement of said second article, said member and said second article engaged thereby constituting a backing for said first article to facilitate the grasping thereof by said grasping means.

13. In apparatus of the character described, an inclined slideway for a row of articles, a latching device mounted for pivotal movement at the outlet of said slideway to engage the foremost article in position at said outlet, article grasping means operable to engage the foremost article at said outlet and to carry said foremost article to a position removed therefrom, a movable detent operable to engage said latching device to releasably retain said foremost article in position at said outlet, and means for operating said grasping means and said detent in timed relation so that said detent disengages said latching device upon movement of said grasping means to engage said foremost article and said detent engages said latching device upon movement of said grasping means to remove said foremost article from said slideway.

References Cited in the file of this patent

UNITED STATES PATENTS

| | | |
|---|---|---|
| 447,144 | Clyne | Feb. 24, 1891 |
| 518,340 | Berger | Apr. 17, 1894 |
| 1,517,971 | Fassinger | Dec. 2, 1924 |
| 1,699,091 | Butter | Jan. 15, 1929 |
| 2,078,694 | Smith | Apr. 27, 1937 |
| 2,181,290 | Wilkins | Nov. 28, 1939 |
| 2,251,158 | Ogrodowy | July 29, 1941 |
| 2,261,134 | Blair | Nov. 4, 1941 |
| 2,338,002 | Mero | Dec. 28, 1943 |
| 2,390,170 | Poole | Dec. 4, 1945 |
| 2,519,655 | Herring | Aug. 22, 1950 |
| 2,558,633 | Tuttle | June 26, 1951 |
| 2,604,577 | Strickland et al. | July 22, 1952 |